US005899226A

United States Patent [19]

Devaud et al.

[11] Patent Number: 5,899,226

[45] Date of Patent: May 4, 1999

[54] HYDRAULIC DIRECTIONAL VALVE FOR SERVOCONTROLS OF AIRCRAFT IN PARTICULAR HELICOPTERS

[75] Inventors: Gérard Devaud, Paris; Arnaud Libault de la Chevasnerie, Ville D'Avary, both of France

[73] Assignee: S.A.M.M.—Societe D'Applications Des Machines Motrices, Bievres, France

[21] Appl. No.: 08/827,003

[22] Filed: Mar. 25, 1997

[30] Foreign Application Priority Data

Apr. 3, 1996 [FR] France .................................. 96 04197

[51] Int. Cl.[6] .................................................... F16K 37/00

[52] U.S. Cl. ........................ 137/554; 137/625.22; 91/509

[58] Field of Search .............................. 137/554, 625.22, 137/625.23, 625.47; 91/509

[56] References Cited

U.S. PATENT DOCUMENTS

| | | | |
|---|---|---|---|
| 3,482,486 | 12/1969 | Nordholm, Jr. | 91/509 |
| 3,529,514 | 9/1970 | Mayo et al. | 91/509 |
| 3,850,196 | 11/1974 | Fales | 137/554 |
| 4,150,604 | 4/1979 | Fuell | 91/509 X |
| 4,335,745 | 6/1982 | Bouveret et al. | 137/554 |
| 4,619,288 | 10/1986 | McPherson | 137/554 |
| 4,760,864 | 8/1988 | Leclerc | 137/554 X |
| 4,905,572 | 3/1990 | Devaud et al. | 137/625.22 X |

FOREIGN PATENT DOCUMENTS

| | | |
|---|---|---|
| 2004355 | 11/1969 | France . |
| 2099895 | 3/1972 | France . |
| 2352972 | 12/1977 | France . |
| 2460435 | 1/1981 | France . |

*Primary Examiner*—John Rivell
*Attorney, Agent, or Firm*—Sughrue, Mion, Zinn, Macpeak & Seas, PLLC

[57] ABSTRACT

This directional valve comprises a closing element (1) rotatively mounted in a fixed sleeve (5) disposed in a body (2) with interposition of an annular element (4) between the closing element and the sleeve. Means are provided for locking the annular element against rotation in normal use and for permitting the driving of the annular element by the closing element in the event of a seizing of the closing element in the annular element. These locking means comprise a device (12) having a push member (13) mounted laterally on the body at one end of the closing element (1) and extending in a direction perpendicular to the closing element (1), resilient means (15) being provided for biasing the push member against a rocker (30) inside the body, the thrust of which is applied to locking balls (21) which project from recesses (24) provided in an end of the annular element (4).

8 Claims, 4 Drawing Sheets

HYDRAULIC DIRECTIONAL VALVE FOR SERVOCONTROLS OF AIRCRAFT IN PARTICULAR HELICOPTERS

The present invention relates to a hydraulic directional valve or distributor intended in particular for servocontrols of helicopters and aircraft.

French patent 2 460 435 (79 17 184, EP-A 0 021 977, U.S. Pat. No. 4,335,745) discloses a hydraulic directional valve comprising a closing element rotatively mounted in a fixed sleeve disposed in a body with interposition of an annular element between the closing element and the sleeve. Ports are provided radially in the sleeve and in the annular element in the extension of one another for the inlet of a hydraulic fluid under pressure and the oulet thereof to a tank. Passages are provided on the periphery of the annular element to permit the circulation of the fluid from one port to the other in the event of a seizing of the closing element in said annular element. Means are provided for locking the annular element against rotation in normal use and for permitting the driving of said annular element in rotation by the closing element in the event of a seizing of the latter in the annular element.

Thus, in the event that—as a result of an abnormal seizing of the closing element in the annular element or a blocking of the closing element in this annular element due to an accidental insertion of a foreign body—the torque necessary to rotate the closing element in the annular element becomes excessive, the latter is driven in rotation so that the circulation of the hydraulic fluid in the directional valve is ensured. Indeed, the aformentioned locking means are automatically unlocked when a sufficient torque is exerted on the annular element.

Thus this directional valve fully meets operational safety requirements.

The device for maintaining the annular element fixed during normal use of the directional valve and for releasing it in rotation in the event of a seizing of the closing element, comprises, in this prior directional valve, balls which are partly engaged in recesses formed on one end of the annular element and are maintained applied in said recesses, through the medium of a plate, by a rocker pivotally mounted on the body. The end of this rocker remote from the balls is biased by a device including a push member disposed laterally relative to the body of the directional valve and parallel to the closing element, said push member being permanently biased by a spring so as to exert on the rocker a torque for maintaining the balls in position in their recesses. The push member cooperates with an electric switch connected to an alarm light which lights up when the balls urge back the rocker against the action of the return spring owing to a rotation of the annular element in the event of a seizing of the closing element in the latter.

Such a locking device is of relatively large size bearing in mind the space available in the region in which the directional valve is mounted in a helicopter or an aircraft.

According to the invention, the means for locking the annular element against rotation in normal use comprise a device having a push member mounted laterally on the body adjacent an end of said closing element and extending in a direction perpendicular to said closing element, resilient means for biasing said push member against a rocker inside said body, the thrust exerted by said push member being applied through said rocker on locking balls projecting from recesses provided on an end of the annular element.

Such a device is much smaller than the device of the aforementioned French patent.

The invention also has for object to provide a directional valve equipped with a system of small size for detecting the angular position of the closing element.

According to another feature of the invention, the directional valve is provided with at least one inductive detector for detecting the angular position of the closing element and comprising a movable core of which one end is pivotally mounted on an arm extending radially of and connected to rotate with, the closing element, the core being disposed in induction coils.

Preferably, the directional valve is provided with two linear inductive detectors coupled to each other and disposed on opposite sides of the locking device employing a push member, so that, when one of the two cores enters its associated coil, the second core leaves its associated coil.

Further features and advantages of the invention will appear from the following description with reference to the accompanying drawings which illustrate an embodiement of the invention as a non-limitative example.

Figure 1:
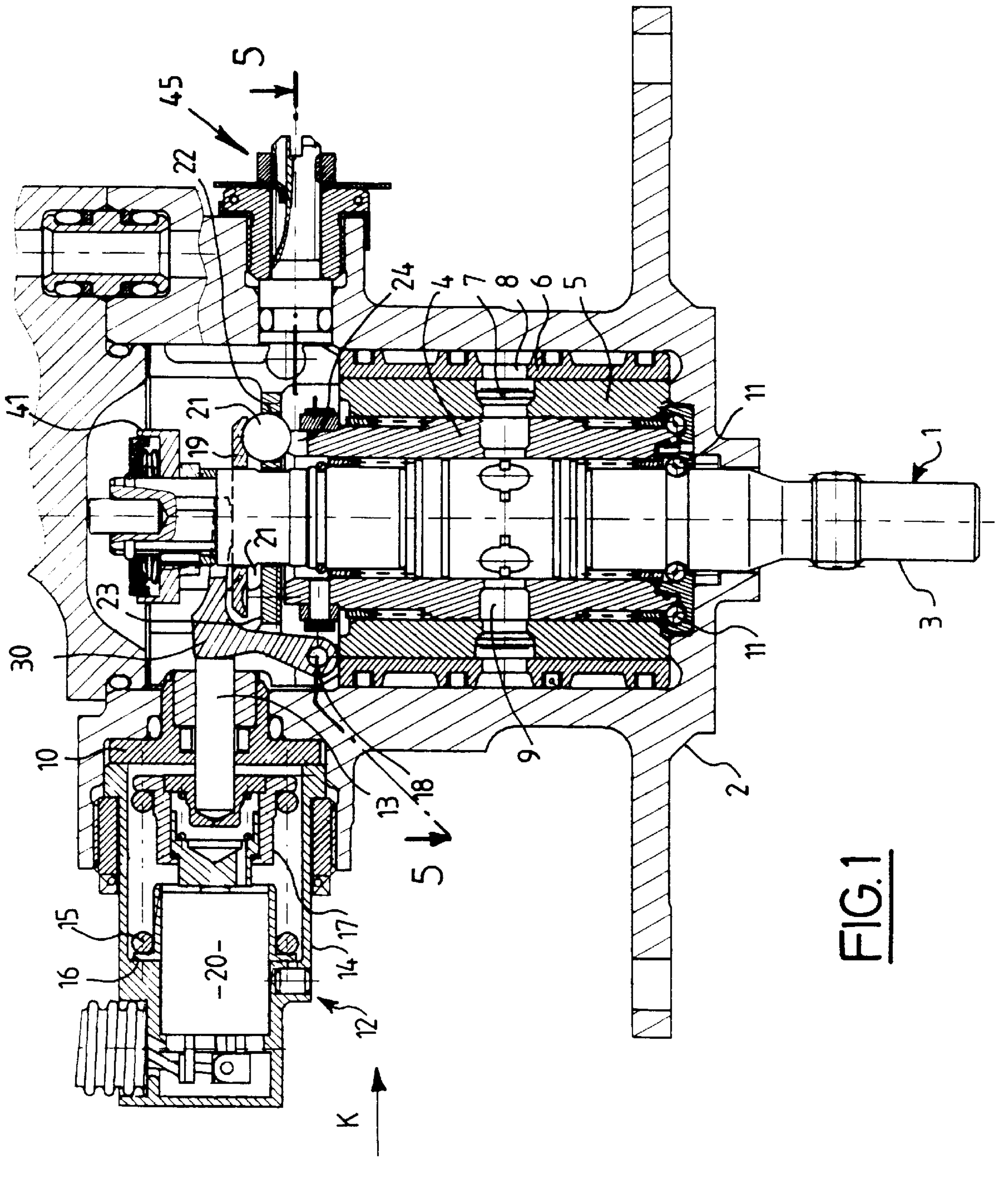
FIG. 1 is an axial sectional view of an embodiment of the hydraulic directional valve according to the invention.

The hydraulic directional valve shown in the drawings is adapted to be part of a device comprising hydraulic servocontrols, of use in particular on aircraft or helicopters, of the type described in the aforementioned French patent, the description of which need not be reproduced here.

The directional valve comprises a central closing element or plug 1, of which the major part is disposed inside a body 2 and an end portion 3 projects from said body and is adapted to be connected to a control lever such as that described in the aforementioned French patent.

The closing element 1 is disposed coaxially in an annular element 4 forming a sleeve which is itself mounted coaxially in a concentric sleeve 5 fixed to the body 2 by means of an annular member 6.

The sleeve 5 and the annular member 6 are provided with two pairs of ports 7, 8 respectively arranged radially and spaced apart on the periphery of these parts. Radial ports 9 are also formed in the annular element 4 in the extension of the ports 7, 8.

These ports 7, 8, 9 are part of a hydraulic circuit permitting the inlet of a hydraulic fluid under pressure and the outlet thereof to a tank, passages being provided on the periphery of the annular element 4 to permit the circulation of the fluid from one port to the other in the event of a seizing of the closing element 1 in the annular element 4. The whole of the hydraulic circuit of this directional valve is described in detail in the aforementioned French patent.

The annular element 4 and the closing element 1 are mounted at one of their ends on ball bearings 11 placed against inner shoulders of the body 2.

The means for locking against rotation the annular element 4, in normal use of the directional valve, comprise a device 12 having a push member 13 laterally mounted on the body 2 adjacent an end of the closing element 1, the push member 13 extending in a direction perpendicular to the latter. The device 12 comprises a housing 14 containing a coil spring 15 which bears against an annular shoulder 16 of the housing 14, the opposite end of the spring exerting an axial thrust on a cup 17 connected to a rod constituting the axial push member 13. The housing 14 is partly engaged in a corresponding recess in the body 2.

The end of the push member 13 acts on a rocker lever 30 disposed inside the body and pivotally mounted on a pin 18 mounted on the body 2 transversely of the push member 13. The rocker 30 comprises two branches 30*a* forming a fork which surrounds the end of the closing element 1. The branches 30*a* in this way exert on a washer 19 coaxial with the closing element a thrust having an axial component relative to the closing element 1. This thrust is applied on a plurality of balls 21 arranged along the periphery of the end of the annular element 4.

An eccentric 45 is mounted on the body 2 substantially in alignment with the balls 21 and extends transversely relative to the closing element 1. This eccentric 45 serves to regulate the hydraulic zero of the closing element 1 through the medium of the annular element 4 in the known manner.

The balls 21 are preferably arranged at equal angular distances apart around the closing element 1 and are engaged in corresponding diametral openings 22 provided in a plate 23 inside the body 2 extending in a direction perpendicular to the closing element 1 which extends through a corresponding central opening in the plate 23. The balls 21 are partly engaged in recesses 24 which have a preferably V-shaped profile and are provided in the end face of the annular element 4.

Consequently, in normal use of the directional valve, when there is no seizing between the closing element 1 and the annular element 4, that is, when the closing element 1 normally rotates about its axis relative to the annular element 4, the latter is prevented from rotating by the thrust exerted by the spring 15 on the locking balls 21 through the medium of the push member 13, the rocker 13 and the washer 19.

When an accidental cause results in a seizing of the closing element 1 relative to the annular element 4, the latter is driven in rotation by the closing element 1 as soon as the torque developed by the closing element exceeds the opposing torque maintaining the balls 21 in the recesses 24 developed by the spring 15, the push member 13 and the rocker 30. In this case, the torque produced by the seizing of the closing element 1 rotates the annular element 4 and this causes the balls 21 to leave their recesses 24 and raise the washer 19 in opposition to the opposing force exerted by the push member 13 and the spring 15.

The locking device just described is much smaller than that of the aforementioned French patent owing to the lateral arrangement of the device relative to the closing element 1.

The cup 17 has its travel limited by the inner end 10 of the housing 14 fitted in the body 2.

Figure 2:
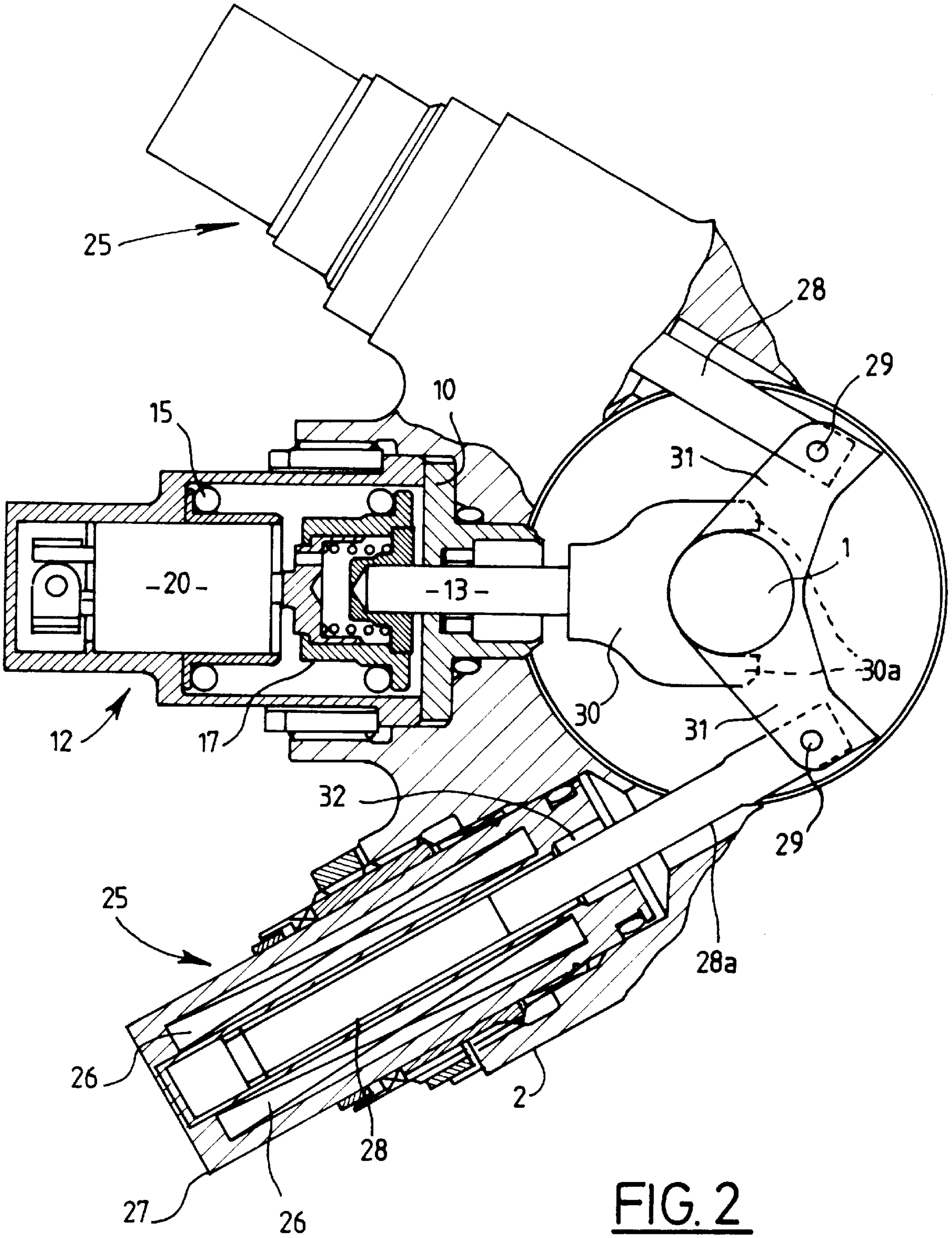
FIG. 2 is a simplified plan view of the directional valve of FIG. 1 showing the device for locking the annular element against rotation and two inductive detectors detecting the angular position of the closing element placed on opposite sides of the locking device.
Figure 3:
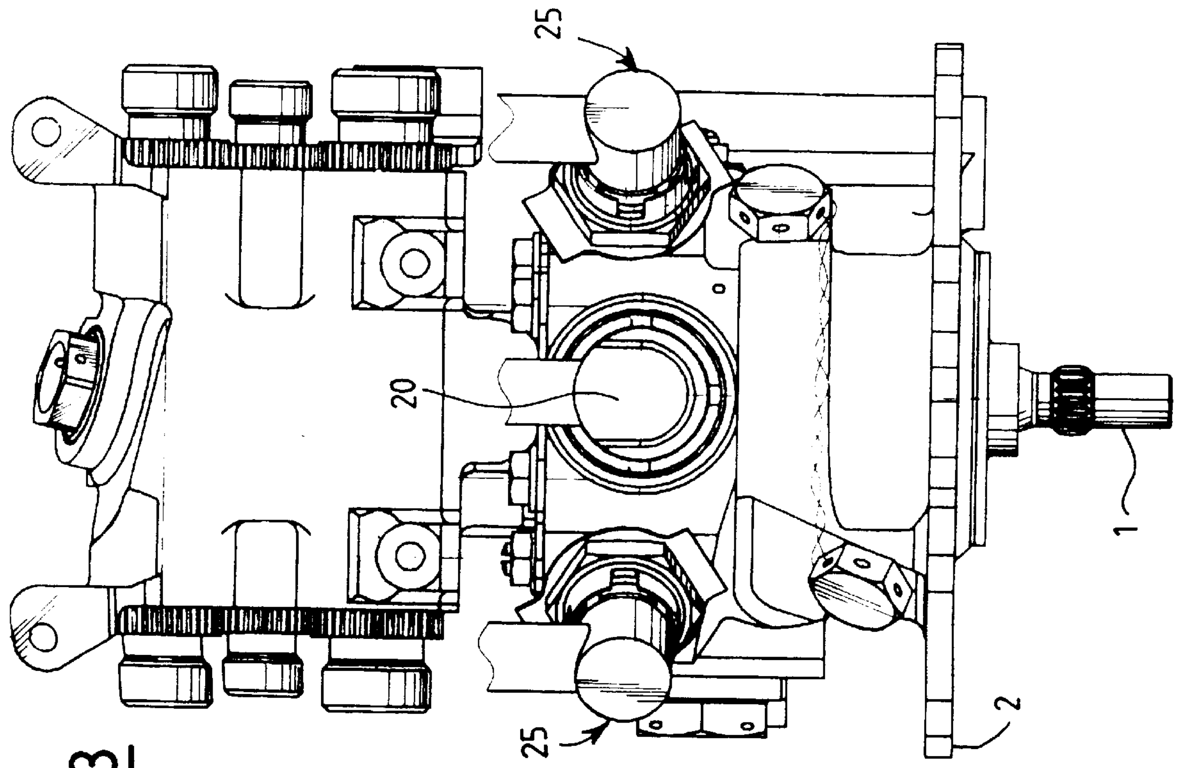
FIG. 3 is a side elevational view in the direction of arrow K of FIG. 1.

The directional valve is also equipped with at least one inductive detector 25 for detecting the angular position of the closing element 1, which permits controlling the position of the latter. In the presently-described embodiment, the directional valve consequently comprises two detectors 25 disposed on opposite sides of the device 12 for locking the annular element 4 (FIG. 2), these two detectors being coupled to each other.

Figure 4:
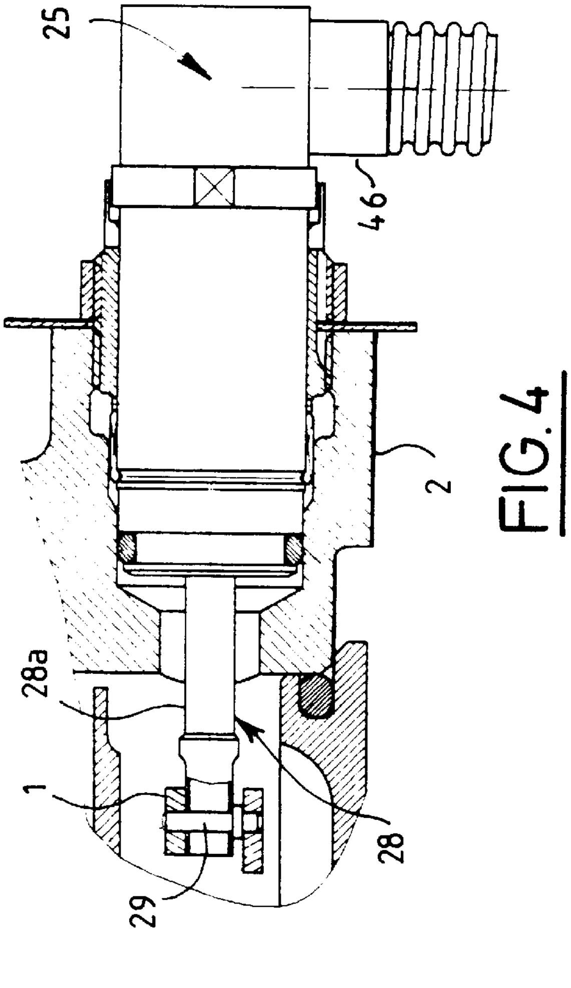
FIG. 4 is a half sectional and half elevational view, to a scale larger than that of FIG. 3, of an inductive detector detecting the angular position of the closing element.

Each detector 25 is of the linear type and comprises inductive coils 26 which have an output 46 (FIG. 4), are disposed in a housing 27 suitably fixed on the body 2 and are provided with an axial core 28 movable in axial translation inside the coils 26. Each core 28 consists of a tube of which a part 28*a* extends out of the housing 27, the end of this part 28*a* being pivotally mounted by a pin 29 on an arm 31 which extends radially of the closing element 1 and is connected to rotate with one end of the latter. The two arms 31 are consequentally connected to rotate with the closing element 1 and make a suitable angle therebetween by defining a wide-open V.

Each core 28 extends through the corresponding end 27 of the housing through an opening 32 which is substantially larger than the outside diameter of the core 28. This arrangement allows the core a possibility of a transverse movement in the housing 27 resulting from rotations of its pivotal mounting on the associated arm 31 connected to the closing element 1.

The hydraulic directional valve according to the invention comprises a device for testing the correct operation of the locking means 12 for the annular element 4. This testing device 33 (shown in FIG. 5) comprises a jack 34 disposed in the body 2. The jack 34 comprises a cylinder 35 containing a piston 36 which is provided with a rod 37 perpendicular to the axis of closing element 1 and is constantly biased by a coil spring 38 inside the cylinder 35. The rod 37 is consequently constantly applied against a radial lug 39 projecting from a collar 31 which is mounted on the end of the annular element 4 on which the locking balls 21 are mounted and is connected to rotate with the annular element 4 by a radial stud 42. Further, the jack 34 is positioned in a cylindrical chamber 43 communicating with the hydraulic supply circuit.

This testing device operates in the same way as that described in the aforementioned French patent so that its operation need not be described in detail here.

It will merely be mentioned that, if the chamber 43 is not under pressure owing to the absence of oil coming from the hydraulic circuit, the thrust of the spring 38 is exerted on the piston 36 without opposition so that the piston 36 comes to a position of abutment at the inner end of the cylinder 35 and the rod 37 drives the arm 39 and the annular element 4 in rotation in the clockwise direction.

Consequently, the balls 21 are urged out of their recesses 24, roll along inclined ramps of the latter, slide in passage openings of the guide plate 23 and cause the rocker 30 to pivot about the pin 18. The push member 13 moves rearwardly and, through the medium of the cup 17, actuates a switch 20 inside the housing 14. This switch 20 then lights up the alarm light (not shown) which consequentally indicates to the operator that the annular element 4 is unlocked from its normal position. The introduction of the hydraulic fluid under pressure in the chamber 43 until the force of its pressure overcomes the opposing force exerted by the spring 38, returns the jack 34, the arm 39 and the annular element 4 to their initial positions.

Thus this testing device 34 employing the jack permits checking that the device 12 for locking the annular element 4 in its normal position allows the rotation of this annular element when a sufficient torque is exerted on the latter in the absence of the pressurization of the hydraulic chamber 43.

Figure 5:
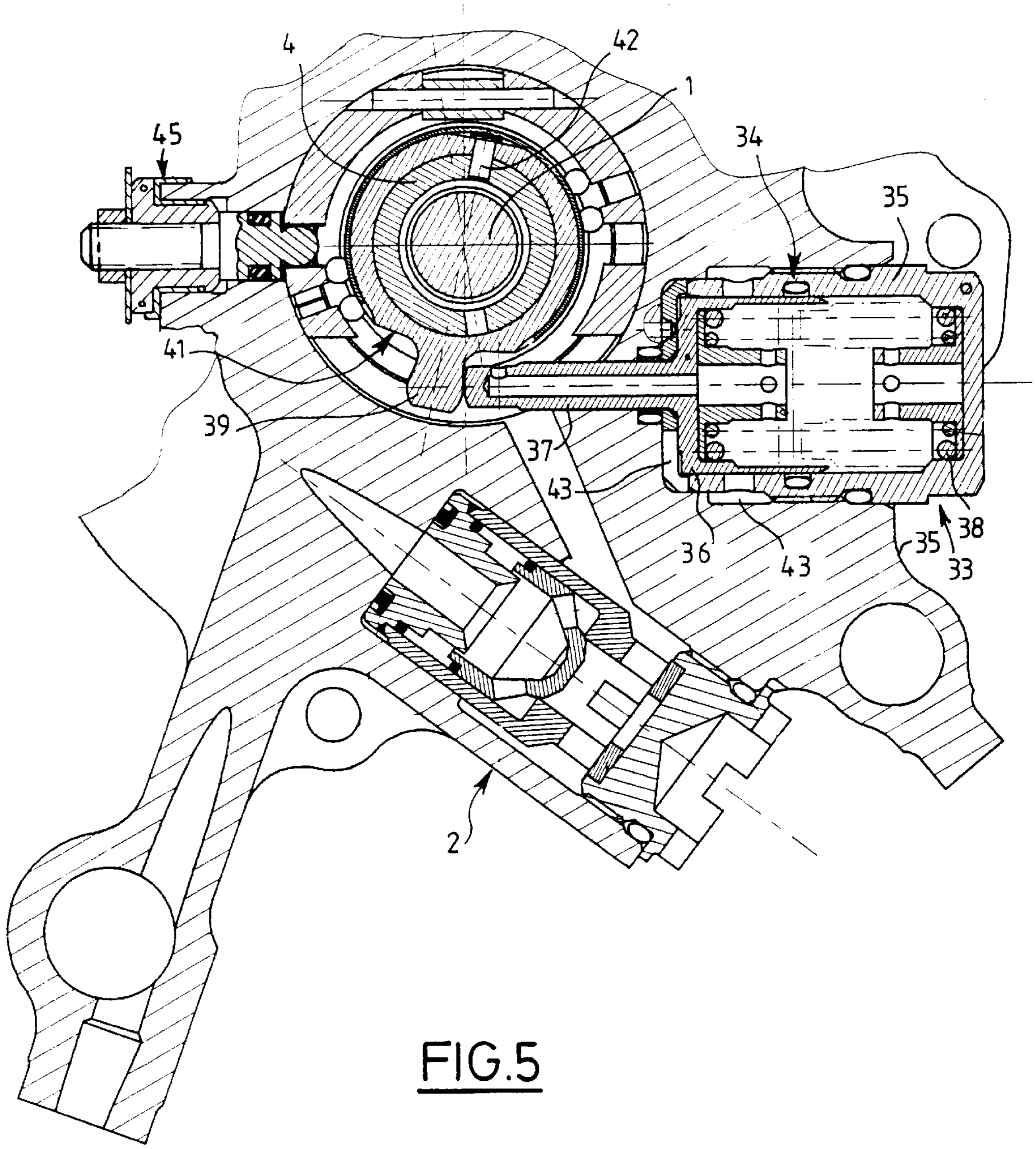
FIG. 5 is a sectional view of the directional valve taken on line 5—5 of FIG. 1.

As can be seen from a comparison of FIG. 5 with FIG. 5 of the aforementioned French patent, the size of the testing device 34 of the directional valve according to the invention is much smaller than the directional valve of the aforementioned French patent.

What is claimed is:

1. Hydraulic directional valve for in particular servocontrols of helicopters and aircraft, said directional valve comprising in combination: a body, a fixed sleeve disposed in said body, a closing element rotatively mounted in said fixed sleeve, an annular element interposed between said closing element and said sleeve, ports provided radially in said sleeve and in said annular element in the extension of one another for the inlet of a hydraulic fluid under pressure and the outlet of said hydraulic fluid to a tank, passages provided on the periphery of said annular element to permit a circulation of said fluid from one of said ports to the other in the event of a seizing of said closing element in said annular element, means for locking said annular element against rotation in normal use and for permitting a driving of said annular element in rotation by means of said closing element in the event of a seizing of said closing element in said annular element, said means for locking said annular element in rotation in normal use comprising a device including a push member which is mounted laterally on said body adjacent one end of said closing element and extends in a direction perpendicular to said closing element, a rocker mounted inside said body, recesses provided in an end of said annular element, and locking balls inserted in and projecting from said recesses, resilient means for biasing said push member against said rocker, said resilient means exerting a thrust which is applied on said locking balls through the medium of said rocker.

2. Directional valve according to claim 1, comprising a washer interposed between said rocker and said balls, said washer having an opening through which an end portion of said closing element axially extends, said washer being maintained applied against said balls by said rocker, and said balls being arranged along the periphery of an end of said annular element.

3. Directional valve according to claim 2, wherein said rocker is pivotally mounted on a pin mounted on said body and comprises two branches surrounding said closing element and maintained applied against said washer.

4. Directional valve according to claim 1, further comprising at least one inductive detector for detecting the angular position of said closing element, said at least one detector comprising in combination: an arm which extends radially relative to said closing element and is connected to rotate with said closing element, induction coils, a movable core disposed in said induction coils and having an end portion pivotally mounted on said arm.

5. Directional valve according to claim 2, further comprising at least one inductive detector for detecting the angular position of said closing element, said at least one detector comprising in combination: an arm which extends radially relative to said closing element and is connected to rotate with said closing element, induction coils, a movable core disposed in said induction coils and having an end portion pivotally mounted on said arm.

6. Directional valve according to claim 3, further comprising at least one inductive detector for detecting the angular position of said closing element, said at least one detector comprising in combination: an arm which extends radially relative to said closing element and is connected to rotate with said closing element, induction coils, a movable core disposed in said induction coils and having an end portion pivotally mounted on said arm.

7. Directional valve according to claim 4, comprising a housing containing said coils, an opening in said housing, said core projecting out of said opening of said housing with a clearance allowing a transverse movement in said opening resulting from rotations of said pivotal mounting of said core on said arm.

8. Directional valve according to claim 4, further comprising a device for testing said locking of said annular element, said testing device comprising in combination: a member connected to rotate with said annular element and extending radially of said annular element, a hydraulic jack mounted on said body and including a piston having a rod cooperative with said radially extending member, and resilient means for biasing said piston toward said radially extending member.

* * * * *